United States Patent
Guthrie

Patent Number: 5,080,951
Date of Patent: Jan. 14, 1992

[54] NONWOVEN FABRIC

[76] Inventor: David W. Guthrie, 705 Powers Ferry Rd., Marietta, Ga. 30067

[21] Appl. No.: 389,042

[22] Filed: Aug. 3, 1989

[51] Int. Cl.$^5$ ............................................. B32B 3/02
[52] U.S. Cl. ..................................... 428/85; 428/171; 428/172; 428/280; 428/282; 428/284; 428/287; 428/300; 428/913
[58] Field of Search ............... 428/171, 172, 280, 282, 428/284, 287, 300, 296, 85, 913

[56] References Cited

U.S. PATENT DOCUMENTS

| | | | |
|---|---|---|---|
| 4,205,113 | 5/1980 | Hermansson et al. | 428/286 |
| 4,211,227 | 7/1980 | Anderson et al. | 128/296 |
| 4,355,066 | 10/1982 | Newman | 428/198 |
| 4,373,000 | 2/1983 | Knoke et al. | 428/198 |
| 4,542,060 | 9/1985 | Yoshida et al. | 428/287 |
| 4,550,725 | 11/1985 | Wishman | 128/155 |
| 4,568,581 | 2/1986 | Peoples, Jr. | 428/35 |
| 4,668,566 | 5/1987 | Braun | 428/286 |
| 4,784,892 | 11/1988 | Storey et al. | 428/172 |

*Primary Examiner*—James J. Bell
*Attorney, Agent, or Firm*—Needle & Rosenberg

[57] ABSTRACT

An improved, nonwoven fabric is constructed to have superior cloth-like characteristics including superior tear resistance, liquid absorbency, resistance to linting, resistance to separation of the fabric areas, flexibility, and softness. Said nonwoven fabric is comprised of at least one intermediate area of absorbent fibers sandwiched between a first outer area of reinforcing fibers and a second outer area containing of melt fibers. The areas of the nonwoven fabric of the present invention are bonded together first by needling and then by a heat treatment that melts at least some of the melt fibers.

8 Claims, 1 Drawing Sheet

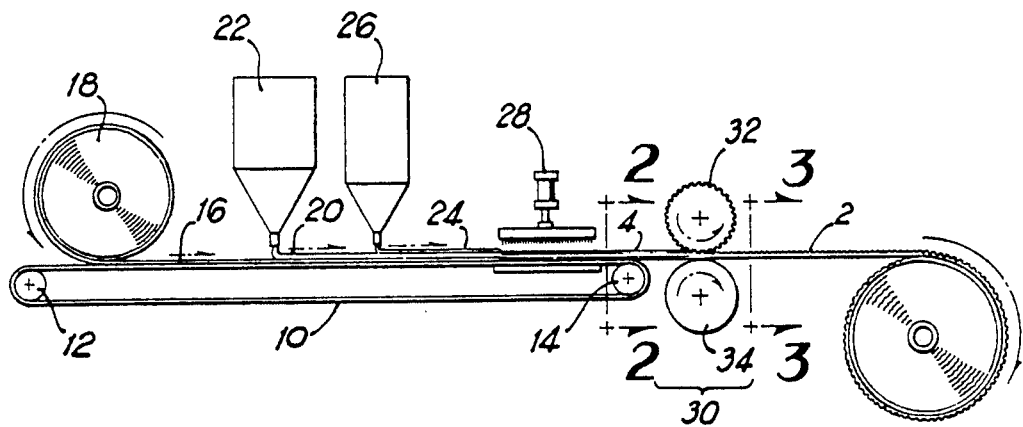
FIG 1
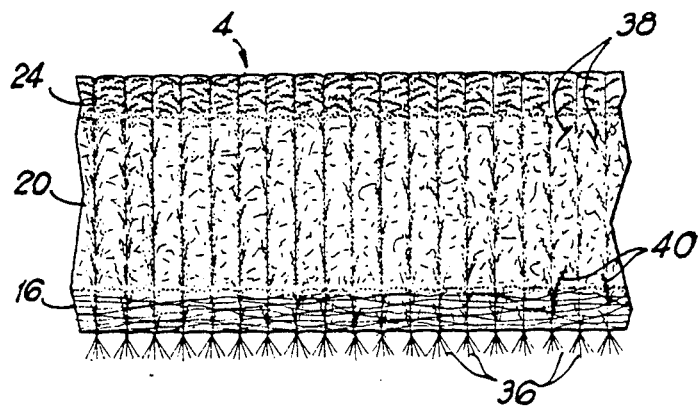
FIG 2
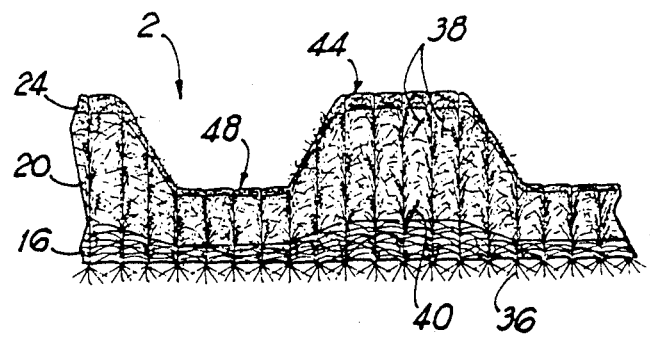 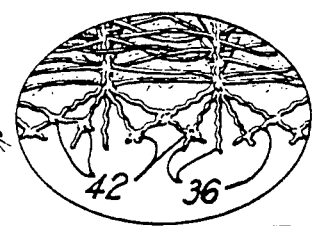
FIG 3 FIG 4

NONWOVEN FABRIC

BACKGROUND OF THE INVENTION

The present invention relates to an improved, nonwoven fabric having superior cloth-like characteristics including superior tear resistance and liquid absorbency.

Nonwoven materials are well known and have found wide spread use in an eclectic variety of applications from molded interior automobile parts to hospital bandages. The application for which a nonwoven material will be used determines the desired characteristics of the material Nonwoven materials used for disposable products such as industrial and/or home-use wipes, hospital towels, surgical gowns, wound dressings and the like should have the following characteristics: (1) minimal linting, (2) maximum liquid absorbency, (3) flexibility, (4) tear resistance or tensile strength, (5) resistance to the separation of any laminated layers, and (6) softness or cloth-like aesthetic properties.

Because disposable products are a significant commercial application of nonwoven materials, substantial effort has been expended in the prior art to develop nonwoven products with the above-enumerated characteristics (referred to hereinafter as "cloth-like characteristics"). Examples of prior art, disposable nonwoven materials having some of these cloth-like characteristics can be found in U.S. Pat. No. 4,784,892, to Storey et al.; U.S. Pat. No. 4,668,566, to Braun; U.S. Pat. No. 4,542,060, to Yoshida et al.; and U.S. Pat. No. 4,355,066, to Newman. An example of a prior art method of making a nonwoven product may be found in U.S. Pat. No. 4,205,113 to Hermasson et al.

SUMMARY OF THE INVENTION

It is an object of the present invention to provide a disposable, nonwoven fabric with improved strength and increased liquid-absorbency. It is another object of the present invention to provide a durable, long-lasting, absorbent, disposable nonwoven fabric that can be used for industrial application at significant savings attributable to the durability and absorbency of the fabric. It is a further object of the present invention to provide a nonwoven fabric with minimal linting and other cloth-like characteristics such as softness and flexibility. It is yet a further object of the present invention to provide a process for producing such an improved nonwoven fabric.

These and other objects of the invention are accomplished by providing a nonwoven fabric with an intermediate area of absorbent fibers The intermediate area is substantially sandwiched between two outer areas—a top outer area (the melt fiber area), and a bottom outer area (the reinforcing area). The melt fiber area is comprised partly of melt bonding fibers while the reinforcing area is comprised of a nonwoven material such as a spunbond, meltblown or bonded carded web.

The areas of the nonwoven fabric are bonded first by a needling process which entangles the fibers. The needle entanglement causes some fibers to extend through the entire thickness of the fabric and beyond the surface, thereby leaving short segments of filaments protruding from the exterior surface of the reinforcing area. The areas are further bonded by a thermal process that melts at least some of the melt fibers. The thermal process may incorporate use of a heated roll with a raised pattern on its surface so as to create alternating areas of lesser and greater compaction. The areas of lesser compaction provide void spaces for enhanced liquid absorbency, while the areas of greater compaction enhance liquid absorbency by providing denser areas for liquid flow (wicking).

The method for manufacturing the improved nonwoven fabric of the present invention is comprised of applying an area comprised partly of absorbent fibers onto a continuously advancing area of reinforcing synthetic fibers; applying an area comprised partly of melt fibers on top of the absorbent fibers; interconnecting the three areas by entanglement of the fibers by needling; and finally, passing the needled areas through a calendar having at least one roll heated to a temperature sufficient to melt some of the melt fibers. The final product may be wound onto a supply roll.

BRIEF DESCRIPTION OF THE DRAWINGS

FIG. 1 illustrates one embodiment of an installation for manufacturing the improved nonwoven fabric of the present invention.

FIG. 2 illustrates a cross-sectional view through one embodiment of the improved nonwoven fabric of the present invention before calendaring.

FIG. 3 illustrates a cross-sectional view through one embodiment of the improved nonwoven fabric of the present invention after calendaring in which one of the calendar rolls is engraved with lands and grooves.

FIG. 4 illustrates melt fiber welds between fiber ends protruding through the surface of one embodiment of the nonwoven fabric of the present invention after passing through a calendar having both rolls heated.

DETAILED DESCRIPTION

The nonwoven fabric 2 of the present invention, as shown in FIG. 3, is comprised of an intermediate absorbent area 20 sandwiched between a melt fiber layer 24 and a reinforcing area 16. FIG. 1 is a schematic diagram showing a preferred embodiment of an apparatus for manufacturing the nonwoven composite of the present invention.

The apparatus shown in FIG. 1 comprises a conveyor belt 10 which is driven by rollers 12 and 14. An area of reinforcing fibers 16 is laid onto the conveyer belt 10 from roll 18. The area of reinforcing fibers 16 may be comprised of nylon, polyester, cotton or other synthetic or natural fiber filaments. The area of reinforcing fibers 16 may be a mixture of fibers that includes melt fibers The fiber filaments that comprise the area of reinforcing fibers 16 may be a nonwoven material in the form of a spunbond, meltblown, wet or dry laid or other reinforcing fibers.

Onto this reinforcing area 16 are layered the fibers of the intermediate absorbent area 20. The fibers of the intermediate absorbent area 20 may be comprised of any natural or synthetic absorbent fibers, for example rayon, cotton, polyester, nylon, glass, carbon or polyolefin fibers. The area of absorbent fibers 20 is layered from air laid device 22. The absorbent fibers may be mixed with other fibers, for example melt fibers such as polypropylene or polyethylene melt or bicomponent fibers. If the nonwoven fabric is to be used to absorb hydrophilic liquids, a hydrophilic fiber will be used as the absorbent fiber. If the nonwoven fabric will be used to absorb oleophilic liquids, an oleophilic absorbent fiber will be used.

Melt fiber area 24 is placed on top of the intermediate absorbent area 20 from the air laid device 26. Melt fiber area 24 may be comprised of any fiber having a significantly lower melting point than the fibers in the intermediate absorbent area 20, for example, polypropylene or polyethylene melt fibers. The melt fibers in the melt fiber area 24 may be mixed with other fibers such as for example, polyester, cotton or nylon.

The three areas of fibers are then passed through a needling device 28 after which they are passed through a calendar 30, preferably including top roll 32 and bottom roll 34. One or both of rolls 32 and 34 is heated to a temperature sufficient to melt at least some of the melt fibers in melt fiber area 24 and that may be present in intermediate area 20 and/or reinforcing area 16. One or both of the calendar rolls 32 and 34 may be impressed with a pattern of lands and grooves to form a raised pattern.

The pressure at which the calendar rolls 32 and 34 operate may be varied. Lower pressures produce softer, more drapable, and more cloth-like nonwoven fabric 2. Higher calendar 30 pressures produce a stiffer and more abrasion resistant nonwoven fabric 2. Because of the tensile strength and tear resistance provided by the reinforcing area 16 and the needle entanglement, in addition to the strength provided by the fiber welds that occur when the melt fibers melt, high pressures are not required in the present invention to produce a fabric 2 of superior tensile strength and tear resistance. Thus, a fabric 2 according to the present invention can be made using substantially lower calendaring pressures than are required for conventional nonwoven fabrics Any calendaring pressure above 0 p.s.i. will produce a nonwoven fabric according to the present invention.

After passing through the calendar 30, the finished fabric 2 may be collected onto supply roll 46.

FIG. 2 depicts the nonwoven fabric 4 after it has emerged from the needling device 28. Fibers from intermediate absorbent area 20, melt fiber area 24 and reinforcing area 16 are entangled throughout the crossection of the fabric with some fibers 36 extending beyond the surface of the reinforcing area 16. Fibers 38 are entangled between the melt fiber area 24 and the intermediate absorbent area 20, while fibers 40 are entangled between the absorbent area 20 and the outer reinforcing area 16.

FIG. 3 depicts a preferred embodiment of the nonwoven fabric 2 of the present invention which is formed after the areas of needled fibers have emerged from the calendaring step of the manufacturing process. The calendaring process compresses the fabric and at least partially melts the melt fibers. The nonwoven fabric is impressed with a pattern of lands 44 and grooves 48 on one side from the lands and grooves engraved on one roll of the calendaring device 30. Some of the melt fibers that were intermixed within the intermediate absorbent area 20 have melted to adjacent absorbent fibers to form a scattering of fiber welds (not shown in the figures) between the fibers that comprise the intermediate absorbent area 20. The melt fibers in the melt fiber area 24 are at least partially melted and in melting have formed melt fiber welds with adjacent fibers (not shown in the figures). Some of these fiber welds (not shown in the figures) capture the ends of fibers that extend through the crossection of the nonwoven composite.

If both calendar rolls are heated, fibers that protrude through the surface of the reinforcing area 16 also may be held in place by fiber welds 42 between adjacent protruding fibers 36 as shown in FIG. 4. Any melt fiber in the reinforcing area 16 will also melt to form fiber welds (not shown in the figures) between fibers in reinforcing area 16.

The protrusion of fibers 36 through the reinforcing area 16 gives that area a soft cloth-like feel. Because these protruding fibers 36 are anchored to the fabric 2 as discussed above, they are not easily pulled away from the nonwoven fabric 2 and, as a result, the fabric has minimal linting.

The protrusion of absorbent fibers 36 through the reinforcing area 16 of the nonwoven fabric 2 gives the fabric greater water absorbency and wetability than previously known nonwoven products. Liquids coming into contact with the protruding filaments 36 that protrude through the reinforcing area 16 are drawn along these filaments and into the intermediate absorbent area 20 by capillary action. Liquid absorbency is further enhanced by the pattern of raised 44 and compressed 48 areas which creates a funnel effect and provides apertures through the melt fiber area 24 into the intermediate absorbent area 20. The noncompressed areas 44 of the nonwoven fabric 2 provide reservoirs for holding the absorbed liquid while the compressed areas 48 provide channels for liquid flow (wicking).

The tensile strength of the nonwoven fabric 2 is greater than that found in similar previously known products because none of those products known to the inventor utilizes all three means for providing tensile strength that are utilized in the present invention, namely (1) the entanglement of fibers between intermediate area 20 and both the melt fiber area 24 and the reinforcing area 16, as well as entanglement of fibers through the entire crossection of the fabric extending from the melt fiber area 24 through the surface of the reinforcing layer 16; (2) the fiber welds between fiber filaments within the fabric crossection provided by the disbursement of the melt fibers throughout the fabric and their subsequent melting; and (3) the incorporation into the fabric of reinforcing area 16 comprised of reinforcing fibers which inherently have a high tensile strength and which are bonded to the fabric by the entanglement of fibers as well as by the two types of spot welding.

Because of the use of all three means for providing tensile strength, the area of compaction or spot welds through the three areas is not essential and if used can be kept to a minimum and still yield a product with greater tensile strength than previously known products By keeping the area of compaction to a minimum, absorbency and softness are maximized.

The nonwoven fabric 2 of the present invention provides superior resistance to the separation of layers than previously known products because of the entanglement of fibers between the areas and through the entire width of the fabric.

The present invention also provides a nonwoven fabric with superior softness and cloth-like aesthetic qualities because of the cloth-like feel that results from the protrusion of fiber ends 36 through the surface of the reinforcing area 20 of the fabric 2. The void space within the intermediate absorbent area 20 enhances the cloth-like flexibility and feel of the nonwoven fabric of the present invention.

The invention is not limited to any specific embodiment or to the specific embodiment described in the following Example but a variety of modifications are possible within the scope of the appended claims.

EXAMPLE 1

The nonwoven fabric of the invention was prepared using the apparatus shown in FIG. 1. The reinforcing fibers were comprised of spunbonded nylon monofilaments (100% continuous filament nylon 6, 6 produced by James River Corporation, Greenville, S.C. and sold as PBN-TT TM Spunbond Nylon). The intermediate absorbent area was comprised of a mixture of 85% rayon (Fibro ® 1.5 in. length × 1.5 dpf from Courtlands North America, Inc. N.Y., N.Y.) and 15% melt fibers, (100% polypropylene staple fibers, Type 185, 1.5 in. length × 2 dpf, from Hercules, Inc. Wilmington, Del.). The melt fiber area was comprised 100% of carded polypropylene staple fibers (Type 185, 1.5 in. length × 2 dpf, from Hercules Inc. Wilmington, Del). The fabric areas were compressed in a vertical calendar at a pressure of 90 psi. The top roll of the calendar was impressed with a raised pattern to provide a final fabric having a pattern of areas of lesser and greater compaction. The top roll of the calendar was heated to 310° F. and the bottom roll was not heated. The final product had the following properties:

| | |
|---|---|
| Basis Weight: | 2.5 oz/yd$^2$ |
| Thickness: | .022 in |
| Density: | 9.17 lb/ft$^3$ |
| Strip Tensile: | MD 16.25 lb/in |
| | CD 3.31 lb/in |
| Elongation: | MD 45.52% |
| | CD 51.96% |
| Trap Tear: | MD 10.0 lbs |
| | CD 4.2 lbs |
| Abrasion Resistance: | Minimal lint |

EXAMPLE 2

Using the apparatus shown in FIG. 1, the nonwoven fabric of the invention may be prepared using spunbonded polyester monofilaments (Reemay, Inc., Old Hickery, Tenn.) for the reinforcing area. The intermediate absorbent area may be comprised of 65% polypropylene staple fibers (Type 101, 1.5 in. length × 1.8 dpf, from Hercules, Inc. Wilmington, Del.). The melt fiber area may be comprised of 70% polyethylene melt fibers (Type 201, 1.75 in. Length × 3 dpf from Hercules, Inc. Wilmington, Del.) and 30% polypropylene staple fibers (Type 101, 1.5 in. length × 1.8 dpf, from Hercules, Inc. Wilmington, Del.). The fabric areas may be compressed in a verticle calendar having a top roll impressed with a raised pattern at a pressure of 90 psi. The top of the calendar should be heated to 270° F. with the bottom roll not heated.

The final product will have a density of 6.30 lb/ft$^3$, a basis weight of 2.5 oz/yd$^2$ and other characteristics similar or equal to the characteristics of the final product of Example 1.

What is claimed is:

1. A nonwoven absorbent fabric comprising
    a top fiber area having melt fibers;
    a bottom reinforcing area having high tensile strength reinforcing fibers;
    an intermediate area having absorbent fibers and melt fibers sandwiched between said top fiber area and said bottom reinforcing area;
    said top fiber area, bottom reinforcing area and intermediate area interconnected by an entanglement of said melt fibers, said reinforcing fibers and said absorbent fibers; and
    said top fiber area, bottom reinforcing area and intermediate area stabilized by melt fiber welds between adjacent said melt fibers, between said melt fibers and said absorbent fibers, between said melt fibers and said reinforcing fibers and between fibers which protrude through said bottom reinforcing area.

2. The nonwoven fabric of claim 1, wherein said intermediate area, said top fiber area and said reinforcing area are further bonded together by a pattern of compressed areas forming spot welds through the cross section of the fabric.

3. The nonwoven fabric of claim 1, wherein said top fiber area is comprised of from 30 to 100% polyolefin melt fibers.

4. The nonwoven fabric of claim 3, wherein said polyolefin melt fibers are selected from the group consisting of polypropylene and polyethylene melt fibers.

5. The nonwoven fabric of claim 1, wherein said intermediate absorbent area is comprised of from about 10 to 60% polyolefin melt fibers and from about 40 to 90% absorbent staple fibers.

6. The nonwoven fabric of claim 5, wherein said polyolefin melt fibers are selected from the group consisting of polypropylene and polyethylene melt fibers.

7. The nonwoven fabric of claim 5, wherein said absorbent staple fibers are selected from the group consisting of rayon, polyester, polypropylene, nylon, fiberglass and cotton fibers.

8. The nonwoven fabric of claim 1, wherein said bottom reinforcing area is comprised of fiber filaments selected from the group consisting of nylon, polyester, polypropylene, cotton, fiberglass and rayon fiber filaments.

* * * * *